US011817982B2

(12) United States Patent
Nakahira et al.

(10) Patent No.: US 11,817,982 B2
(45) Date of Patent: Nov. 14, 2023

(54) WIRELESS CONNECTION UNITS SELECTION FOR TERMINAL STATION

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 190 days.

(21) Appl. No.: 17/439,851

(22) PCT Filed: Mar. 11, 2020

(86) PCT No.: PCT/JP2020/010642
§ 371 (c)(1),
(2) Date: Sep. 16, 2021

(87) PCT Pub. No.: WO2020/195855
PCT Pub. Date: Oct. 1, 2020

(65) Prior Publication Data
US 2022/0191076 A1    Jun. 16, 2022

(30) Foreign Application Priority Data

Mar. 25, 2019 (JP) ................................ 2019-057392

(51) Int. Cl.
*H04L 27/26* (2006.01)
*H04L 5/00* (2006.01)
*H04W 16/28* (2009.01)

(52) U.S. Cl.
CPC ........ *H04L 27/2607* (2013.01); *H04L 5/0082* (2013.01); *H04W 16/28* (2013.01)

(58) Field of Classification Search
CPC . H04L 27/26; H04L 27/2602; H04L 27/2607; H04L 5/003; H04L 5/0078;
(Continued)

(56) References Cited

U.S. PATENT DOCUMENTS

2002/0071415 A1* 6/2002 Soulabail ............. H04B 7/2643
370/347
2007/0274203 A1* 11/2007 Kimura ............... H04L 27/2647
370/208
(Continued)

FOREIGN PATENT DOCUMENTS

EP        1942623 A1 *  7/2008  ......... H04L 27/2607
KR    2021/0033861     *  3/2021  ............. H04L 27/26

OTHER PUBLICATIONS

IEEE Std 802.11ac-2013, Dec. 2013.
International Search Report issued in PCT/JP2020/010642, dated Jun. 16, 2020.

*Primary Examiner* — Warner Wong
(74) *Attorney, Agent, or Firm* — Harness, Dickey & Pierce, P.L.C.

(57) ABSTRACT

A wireless communication method for connecting a base station with each of a plurality of terminal stations set to differ in Guard interval length, with the base station being equipped with a plurality of wireless communications units each configured to be connectable with one or more of the terminal stations, includes: a collection step of collecting information about the Guard interval length set for each of the terminal stations and connection information about the terminal stations; a policy calculation step of calculating a setting policy for setting the Guard interval length permitted for each of the wireless communications units and a switch-
(Continued)

ing policy for setting a condition for switching that one of the wireless communications units which is to be connected, for each of the terminal stations, based on each of the collected information about the Guard interval length and connection information about the terminal stations; and a setting step of setting those of the terminal stations which are to be connected, for each of the wireless communications units based on the calculated setting policy and switching policy.

6 Claims, 11 Drawing Sheets

(58) Field of Classification Search
CPC .............. H04L 5/0082; H04L 27/2646; H04L 41/0806; H04L 1/1678; H04L 47/28; H04W 16/00; H04W 16/24; H04W 16/28; H04W 8/00; H04W 8/265; H04W 56/00; H04W 56/003
See application file for complete search history.

(56) References Cited

U.S. PATENT DOCUMENTS

| | | | | |
|---|---|---|---|---|
| 2009/0274126 | A1* | 11/2009 | Satou | ................ H04W 56/0045 |
| | | | | 370/336 |
| 2016/0204968 | A1* | 7/2016 | Zhang | ................. H04L 27/2603 |
| | | | | 370/338 |
| 2018/0331868 | A1* | 11/2018 | Zhang | ................. H04L 27/2603 |

* cited by examiner

Fig. 4

| CLASS | GI:400ns | GI:800ns | GI:1600ns | GI:3200ns |
|---|---|---|---|---|
| A | × | × | × | ○ |
| B | × | × | ○ | ○ |
| C | × | ○ | ○ | ○ |
| D | ○ | ○ | ○ | ○ |

Fig. 8

| CLASS | GI:400ns | GI:800ns | GI:1600ns | GI:3200ns | SETTING POLICY |
|---|---|---|---|---|---|
| A | × | × | × | ○ | POLICY X1 |
| B | × | × | ○ | ○ | POLICY X1 |
| C | × | ○ | ○ | ○ | POLICY X2 |
| D | ○ | ○ | ○ | ○ | POLICY X2 |

Fig. 9

|  |  | SWITCHING POLICY |
|---|---|---|
| FIRST TERMINAL STATION 10 | CLASS A | POLICY Y1 |
| SECOND TERMINAL STATION 20 | CLASS B | |
| THIRD TERMINAL STATION 30 | CLASS C | POLICY Y2 |
| FOURTH TERMINAL STATION 40 | CLASS D | |

WIRELESS CONNECTION UNITS SELECTION FOR TERMINAL STATION

CROSS-REFERENCE TO RELATED APPLICATIONS

This application is a 371 U.S. National Phase of International Application No. PCT/JP2020/010642, filed on Mar. 11, 2020, which claims priority to Japanese Application No. 2019-057392, filed on Mar. 25, 2019. The entire disclosures of the above applications are incorporated herein by reference.

TECHNICAL FIELD

The present invention relates to a wireless communication method and base station.

BACKGROUND ART

High-speed radio access systems that use radio waves in the 5-GHz band include wireless LANs based on IEEE 802.11a, 11n, and 11ac standards. With the 11a standard, a transmission rate of up to 54 Mbit/s is achieved by stabilizing characteristics in a multipath fading environment based on orthogonal frequency division multiplexing (OFDM) modulation scheme. Furthermore, with the 11n standard, a transmission rate of up to 600 Mbit/s is achieved using MIMO (Multiple Input Multiple Output) or channel bonding technology, where the MIMO technology implements space-division multiplexing on the same radio channel using plural antennas while the channel bonding technology implements a 40-MHz frequency channel using two 20-MHz frequency channels simultaneously.

Besides, with the 11ac standard, wireless communications higher in speed and efficiency than the 11n standard are implemented by means of channel bonding technology that realizes a frequency channel for up to 160 MHz using up to eight 20-MHz frequency channels simultaneously, downlink multi-user MIMO technology that simultaneously transmits different signals to multiple destinations on the same channel, or other technology (see, for example, Non-Patent Literature 1).

At present, an IEEE802.11ax standard that focuses on improvement of transmission efficiency in addition to improvement of transmission rate is being worked out. With the 11ax standard, promotion of spatial frequency reuse by means of simultaneous transmission and efficiency improvement of the OFDM modulation scheme as well as uplink and downlink OFDMA transmission and uplink multi-user MIMO transmission in terms of multi-user transmission are expected to become available for use.

Also, it is known that in a wireless LAN, to permit propagation delays between a base station and terminal station due to multipath in a propagation environment, a signal called a Guard interval (GI) is added to an OFDM modulating signal. The Guard interval can be selected from 400 ns and 800 ns according to 11a to 11ac, and from 800 ns, 1600 ns, and 3200 ns according to 11ax. Note that the longer the Guard interval, the longer the permissible propagation delay. On the other hand, the longer the Guard interval, the lower the transmission efficiency.

CITATION LIST

Non-Patent Literature

Non-Patent Literature 1: IEEE Std 802.11ac-2013, December 2013.

SUMMARY OF THE INVENTION

Technical Problem

Conventionally, in a communications environment in which plural terminal stations differing in propagation delay from a base station coexist, the Guard interval length used in conducting data transmission to each terminal station is set according to the propagation delay of the terminal station. However, a long Guard interval resistant to propagation delays is set for control signals, such as a beacon signal, which are essential in order to configure a wireless LAN, because these control signals need to be received by all the terminal stations. Therefore, such a communications environment, in which control signal transmission and data communications coexist, has a problem in that transmission efficiency of the entire system decreases with decreases in transmission efficiency of the control signals.

An object of the present invention is to provide a wireless communications method and base station that can improve transmission efficiency even when conducting wireless communications with each of plural terminal stations set to differ in Guard interval length.

Means for Solving the Problem

According to one aspect of the present invention, there is provided a wireless communications method for connecting a base station with each of a plurality of terminal stations set to differ in Guard interval length, the base station being equipped with a plurality of wireless communications units each configured to be connectable with one or more of the terminal stations, the method comprising: a collection step of collecting information about the Guard interval length set for each of the terminal stations and connection information about the terminal stations; a policy calculation step of calculating a setting policy for setting the Guard interval length permitted for each of the wireless communications units and a switching policy for setting a condition for switching that one of the wireless communications units which is to be connected, for each of the terminal stations, based on each of the collected information about the Guard interval length and connection information about the terminal stations; and a setting step of setting those of the terminal stations which are to be connected, for each of the wireless communications units based on the calculated setting policy and switching policy.

Also, according to another aspect of the present invention, in the wireless communications method, the wireless communications units are allowed to set a plurality of permitted Guard interval lengths.

Also, according to another aspect of the present invention, the wireless communications method further comprises an adjustment step of adjusting propagation delay times permitted by respective ones of the plurality of wireless communications units based on directivity of an antenna or a selection or a combination of a plurality of antennas.

According to another aspect of the present invention, there is provided a base station connected with each of a plurality of terminal stations set to differ in Guard interval length, the base station comprising: a plurality of wireless communications units each configured to be connectable with one or more of the terminal stations; a collection unit configured to collect information about the Guard interval length set from each of the terminal stations and connection information about the terminal stations; a policy calculation unit configured to calculate a setting policy for setting the Guard interval length permitted for each of the wireless communications units and a switching policy for setting a condition for switching that one of the wireless communications units which is to be connected, for each of the terminal stations, based on each of the information about the Guard interval length and the connection information about the terminal stations, the information being collected by the collection unit; and a setting unit configured to set those of the terminal stations which are to be connected, for each of the wireless communications units based on the setting policy and switching policy calculated by the policy calculation unit.

Also, according to another aspect of the present invention, in the base station, the wireless communications units are allowed to set a plurality of permitted Guard interval lengths.

Also, according to another aspect of the present invention, the base station further comprises a propagation delay adjustment unit configured to adjust propagation delay times permitted by respective ones of the plurality of wireless communications units based on directivity of an antenna or a selection or a combination of a plurality of antennas.

Effects of the Invention

The present invention makes it possible to improve transmission efficiency even when conducting wireless communications with each of plural terminal stations set to differ in Guard interval length.

BRIEF DESCRIPTION OF DRAWINGS

FIG. 4 is a table showing exemplary classes of terminal stations in a wireless communications system.

FIG. 8 is a table showing a relationship between the class of terminal stations and setting policy.

FIG. 9 is a table showing a relationship between the class of terminal stations and switching policy.

DESCRIPTION OF EMBODIMENTS

Figure 1:
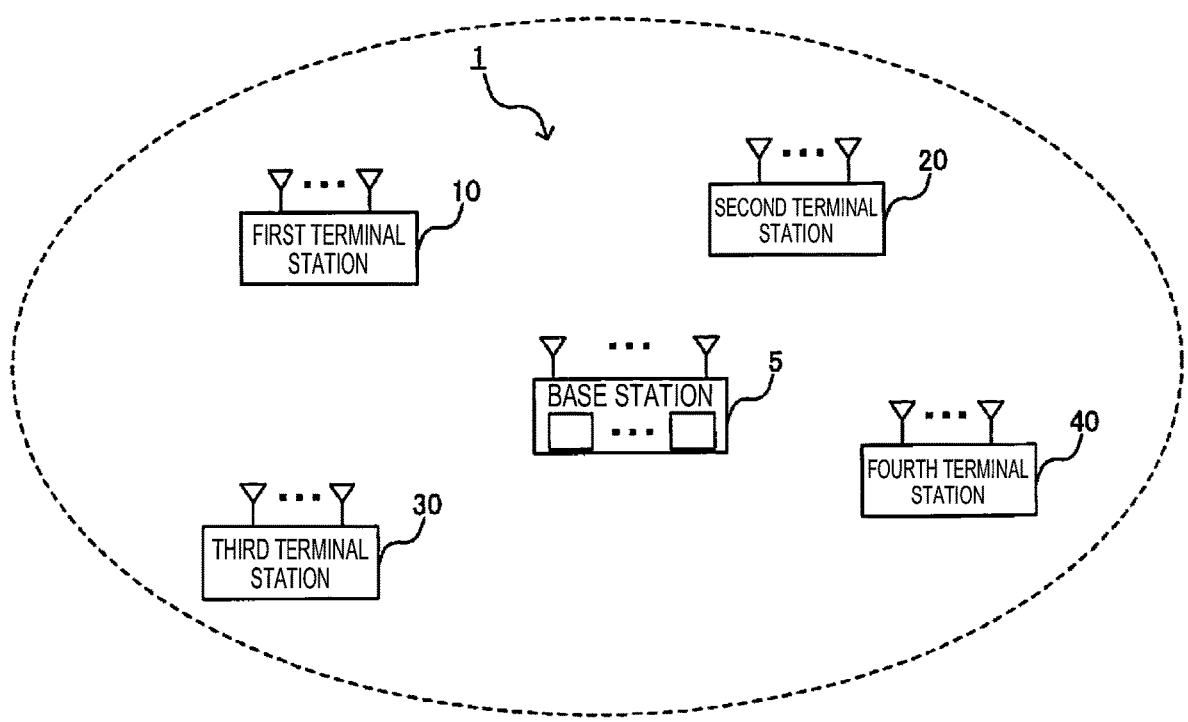
FIG. 1 is a diagram showing a configuration example of a wireless communications system according to an embodiment.

An embodiment of a wireless communications system will be described below with reference to the drawings. FIG. 1 shows a configuration example of a wireless communications system 1 according to the embodiment. As shown in FIG. 1, the wireless communications system 1 includes, for example, a base station 5, and a first terminal station 10, a second terminal station 20, a third terminal station 30, and a fourth terminal station 40 existing in a service area, which is an area in which communications can be conducted with the base station 5.

Here, the first terminal station 10, second terminal station 20, third terminal station 30, and fourth terminal station 40 differ from each other in compatible Guard interval length (see, FIG. 4). Also, plural terminal stations set to the same Guard interval lengths as the first terminal station 10, second terminal station 20, third terminal station 30, and fourth terminal station 40, respectively, may exist in the service area of the base station 5.

Figure 2:
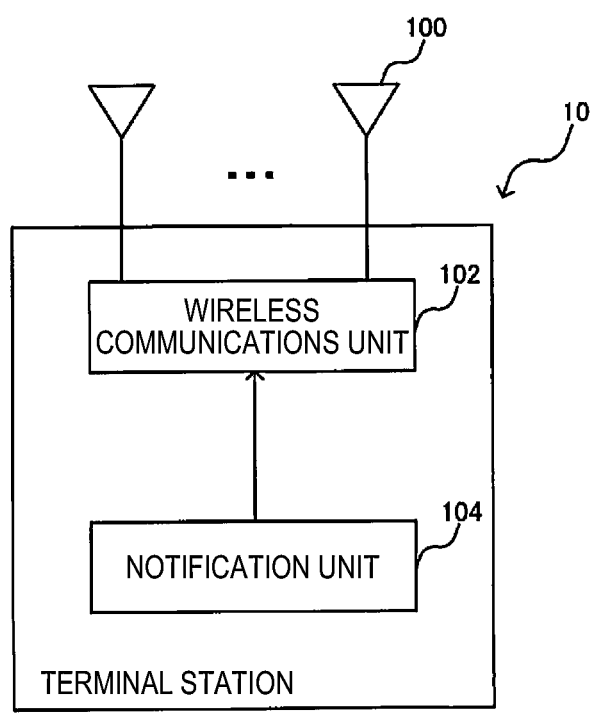
FIG. 2 is a diagram showing a configuration example of a first terminal station.

FIG. 2 shows a configuration example of the first terminal station 10. As shown in FIG. 2, the first terminal station 10 includes plural antennas 100, a wireless communications unit 102, and a notification unit 104. Note that other functional blocks which terminal stations are typically equipped with are not illustrated.

The antennas 100 are connected to the wireless communications unit 102, transmit radio frames inputted from the wireless communications unit 102, and outputs received radio frames to the wireless communications unit 102.

The wireless communications unit 102 converts information inputted, for example, from the notification unit 104 into radio frames, and outputs the radio frames to the antenna 100.

The notification unit 104 outputs information indicating wireless communications standards and communications schemes supported by the first terminal station 10 to the wireless communications unit 102.

Note that the second terminal station 20, third terminal station 30, and fourth terminal station 40 have configuration substantially equal to the first terminal station 10, but each differs from the first terminal station 10 in propagation delay environment as well as in the Guard interval length to be set.

Figure 3:
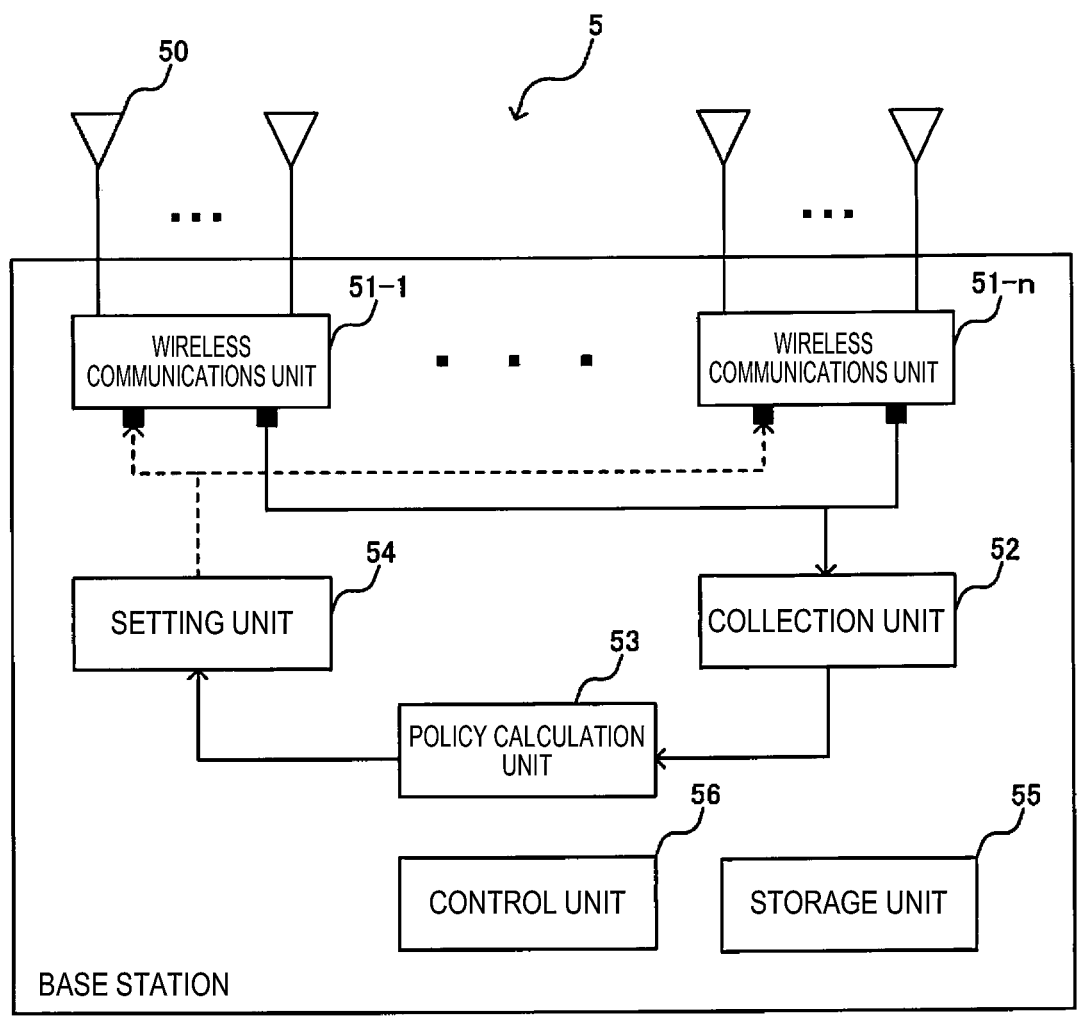
FIG. 3 is a diagram showing a configuration example of a base station according to the embodiment.

FIG. 3 shows a configuration example of the base station 5 according to the embodiment. As shown in FIG. 3, the base station 5 includes, for example, plural antennas 50, n wireless communications units 51-1 to 51-n, a collection unit 52, a policy calculation unit 53, a setting unit 54, a storage unit 55, and a control unit 56. Note that other functional blocks which base stations are typically equipped with are not illustrated.

Plural antennas 50 are connected to each of the wireless communications units 51-1 to 51-n and transmit wireless frames received from the connected wireless communications units 51-1 to 51-n and output the received wireless frames to the other wireless communications units 51-1 to 51-n.

Each of the wireless communications units 51-1 to 51-n is configured to be able to conduct wireless communications independently of one another, with one or more terminal stations (e.g., at least one of the first terminal station 10, second terminal station 20, third terminal station 30, and fourth terminal station 40), for example, via plural antennas 50. Also, each of the wireless communications units 51-1 to 51-n is allowed to set plural permitted Guard interval lengths.

The collection unit 52 collects information about Guard interval lengths set on each of the terminal stations and connection information about the terminal stations, from the wireless communications units 51-1 to 51-n and lists and outputs the collected information to the policy calculation unit 53. For example, as the connection information about the terminal stations, the collection unit 52 collects the number of connected terminal stations, class of each terminal station, and estimated traffic volume regarding each of the wireless communications units 51-1 to 51-n.

Based on the information received from the collection unit 52, i.e., the information about Guard interval lengths set on the terminal stations and connection information about the terminal stations, the policy calculation unit 53 calculates the two policies described below and outputs the policies to the setting unit 54. The first of the policies is a setting policy about standards or communications schemes set for the wireless communications units 51-1 to 51-n, respectively. The second of the policies is a switching policy for determining which of the wireless communications units 51-1 to 51-n each of the terminal stations is to be connected to. For example, the setting policy includes setting the Guard interval length permitted for each of the wireless communications units 51-1 to 51-n. Also, the switching policy includes setting a condition for switching that one of the wireless communications units 51-1 to 51-n which is to be connected, for each of the terminal stations.

For each of the wireless communications units 51-1 to 51-n, the setting unit 54 sets the Guard interval length setting policy as well as the switching policy for determining which of the wireless communications units 51-1 to 51-n each of the terminal stations is to be connected to. That is, based on the setting policy and switching policy calculated by the policy calculation unit 53, the setting unit 54 sets the terminal station to be connected for each of the wireless communications units 51-1 to 51-n.

The storage unit 55 stores, for example, information and the like collected by the collection unit 52. The control unit 56, which includes a no-illustrated CPU and memory, controls various parts of the base station 5.

Thus, based on the Guard interval length setting policy set by the setting unit 54, the wireless communications units 51-1 to 51-n conduct wireless communications independently of one another, with one of the first terminal station 10, second terminal station 20, third terminal station 30, and fourth terminal station 40. That is, the wireless communications system 1 is made up of the base station 5 connected with the first terminal station 10, second terminal station 20, third terminal station 30, and fourth terminal station 40 set to differ in Guard interval length, where the base station 5 is equipped with plural wireless communications units 51-1 to 51-n each configured to be connectable with one or more of the terminal stations.

Then, the wireless communications units 51-1 to 51-n switches connection of the first terminal station 10, second terminal station 20, third terminal station 30, and fourth terminal station 40 based on the switching policy about connectable terminal stations, the switching policy being set by the setting unit 54. Also, the setting policy and switching policy for the wireless communications units 51-1 to 51-n are updated when the setting policy and switching policy calculated by the policy calculation unit 53 based on the information collected by the collection unit 52 are set by the setting unit 54.

Next, a concrete operation example of the wireless communications system 1 will be described.

FIG. 4 shows exemplary classes of terminal stations in the wireless communications system 1. In the table shown in FIG. 4, the first column shows classes of terminal stations, and it is assumed here that the classes are A, B, C, and D. The second to fifth columns show values of Guard interval (GI) length available for selection, and it is assumed here that 400 ns, 800 ns, 1600 ns, and 3200 ns are selectable.

Also, in FIG. 4, combinations of GI and a class capable of normal communications when the propagation delay is considered are indicated by a circle (○) and combinations of GI and a class incapable of normal communications are indicated by a cross (x).

Here, the first terminal station 10 shown in FIG. 1 belongs to class A, the second terminal station 20 belongs to class B, the third terminal station 30 belongs to class C, and the fourth terminal station 40 belongs to class D.

Settings appropriate to the classes of the corresponding terminal stations are made on the wireless communications units 51-1 to 51-n of the base station 5. At least one of the wireless communications units 51-1 to 51-n are configured to be connectable with plural classes of terminal stations. Guard interval lengths compatible with all the classes A, B, C, and D are set, for example, on at least one of the wireless communications units 51-1 to 51-n. Therefore, the first terminal station 10, second terminal station 20, third terminal station 30, and fourth terminal station 40 are configured to be connectable to one of the wireless communications units 51-1 to 51-n of the base station 5 regardless of their classes.

Figure 5:
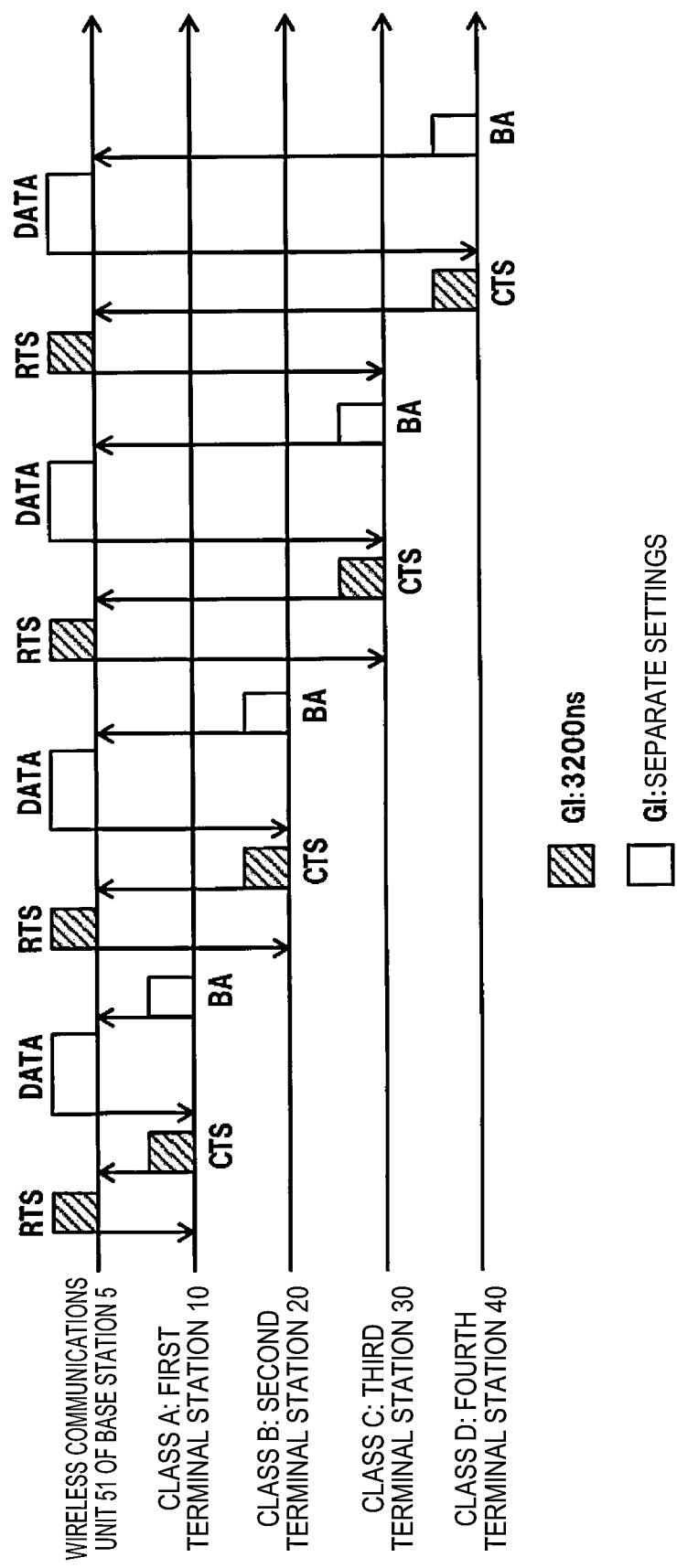
FIG. 5 is a diagram showing a communications example in which plural classes of terminal stations are accommodated in a wireless communications unit.

FIG. 5 shows a communications example in which plural classes of terminal stations are accommodated in any one (hereinafter referred to simply as the wireless communications unit 51) of the wireless communications units 51-1 to 51-n. Here, RTS (Request to Send) and CTS (Clear to Send) signals are to be transmitted to solve a hidden-terminal problem, which is a problem unique to wireless LANs, in transmitting data.

RTS and CTS, which are signals broadcast to other base stations and terminal stations, are transmitted so as to reach all the terminal stations by setting the Guard interval length to a maximum length of 3200 ns on the wireless communications unit 51.

On the other hand, Guard interval lengths corresponding to classes are set for individual data transmissions as well as BA (Block Ack), which is an acknowledge signal.

In this way, in an environment in which plural classes of terminal stations differing in Guard interval length coexist, if a long Guard interval is used in order to transmit signals to all the terminal stations, there can be a case in which transmission efficiency is not maximized.

FIGS. 6(a) and 6(b) show examples in which terminal stations are accommodated on a class by class basis by one of different wireless communications units 51-1 to 51-n. FIG. 6(a) shows a communications example in which a first terminal station 10 of class A and second terminal station 20 of class B are connected to the wireless communications unit 51-1 of the base station 5. FIG. 6(b) shows a communications example in which a third terminal station 30 of class C and a fourth terminal station 40 of class D are connected to the wireless communications unit 51-2 of the base station 5.

In the example shown in FIG. 6(a), because the wireless communications unit 51-1 supports both classes A and B, the Guard interval length is set to 3200 ns and data is exchanged with the first terminal station 10 and second terminal station 20.

Figure 6:
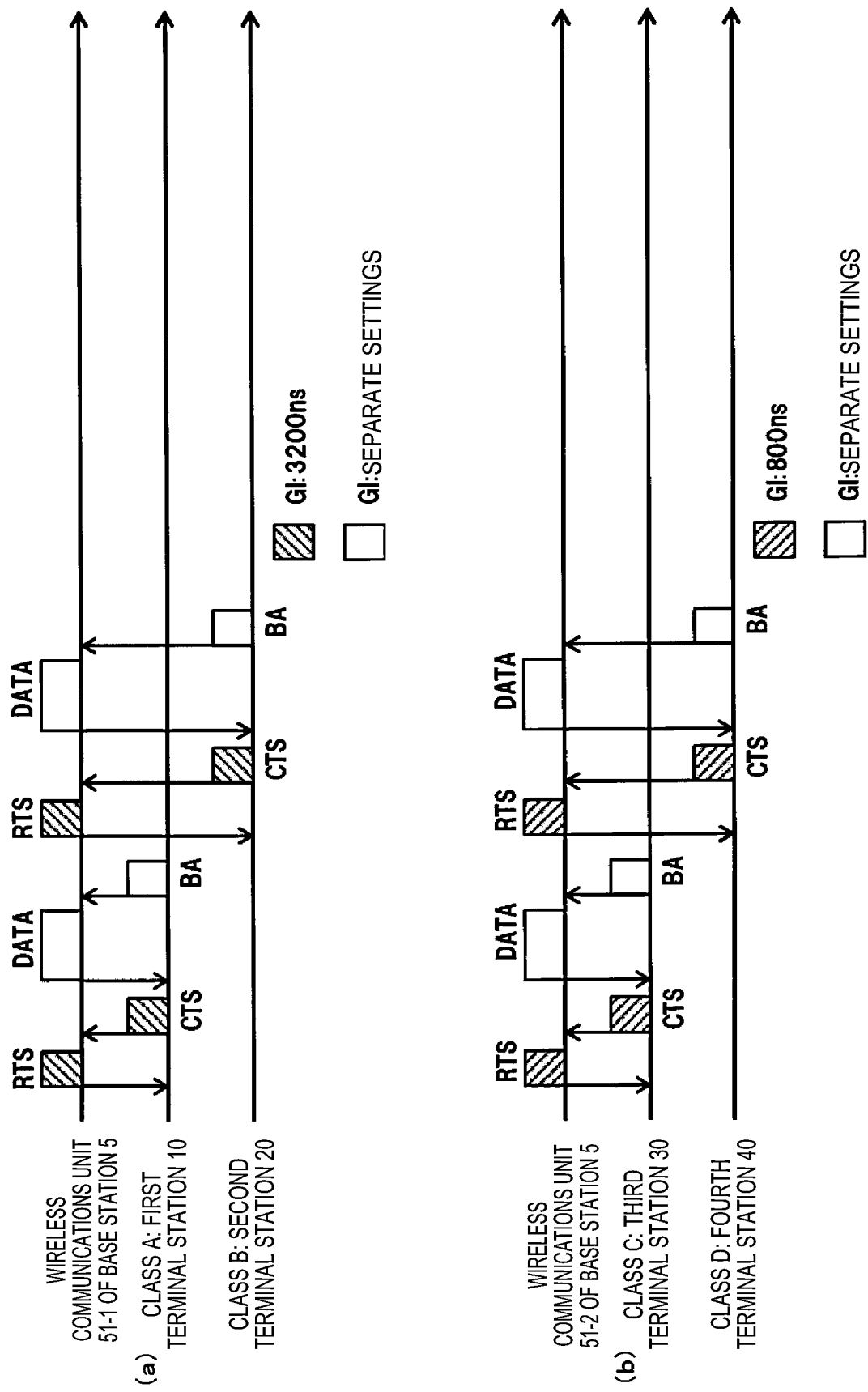
FIG. 6(a) is a diagram showing a communications example in which a first terminal station of class A and a second terminal station of class B are connected to a wireless communications unit of the base station and FIG. 6(b) is a diagram showing a communications example in which a third terminal station of class C and a fourth terminal station of class D are connected to a wireless communications unit of the base station.

In the example shown in FIG. 6(*b*), because the wireless communications unit 51-2 supports both classes C and D, the Guard interval length is set to 800 ns and data is exchanged with the third terminal station 30 and fourth terminal station 40.

In this way, to increase the transmission efficiency of each terminal station, in the wireless communications system 1, preferably the terminal stations are classified based on the respective Guard interval lengths of the terminal stations and accommodated by plural different wireless communications units 51 differing in Guard interval length.

For that, the setting unit 54 sets the setting policy and switching policy for each of the wireless communications units 51-1 to 51-*n*, where the setting policy is used to set the Guard interval lengths selectable by the terminal stations and the switching policy is used to determine the wireless communications units 51 to be connected with the terminal stations.

Figure 7:
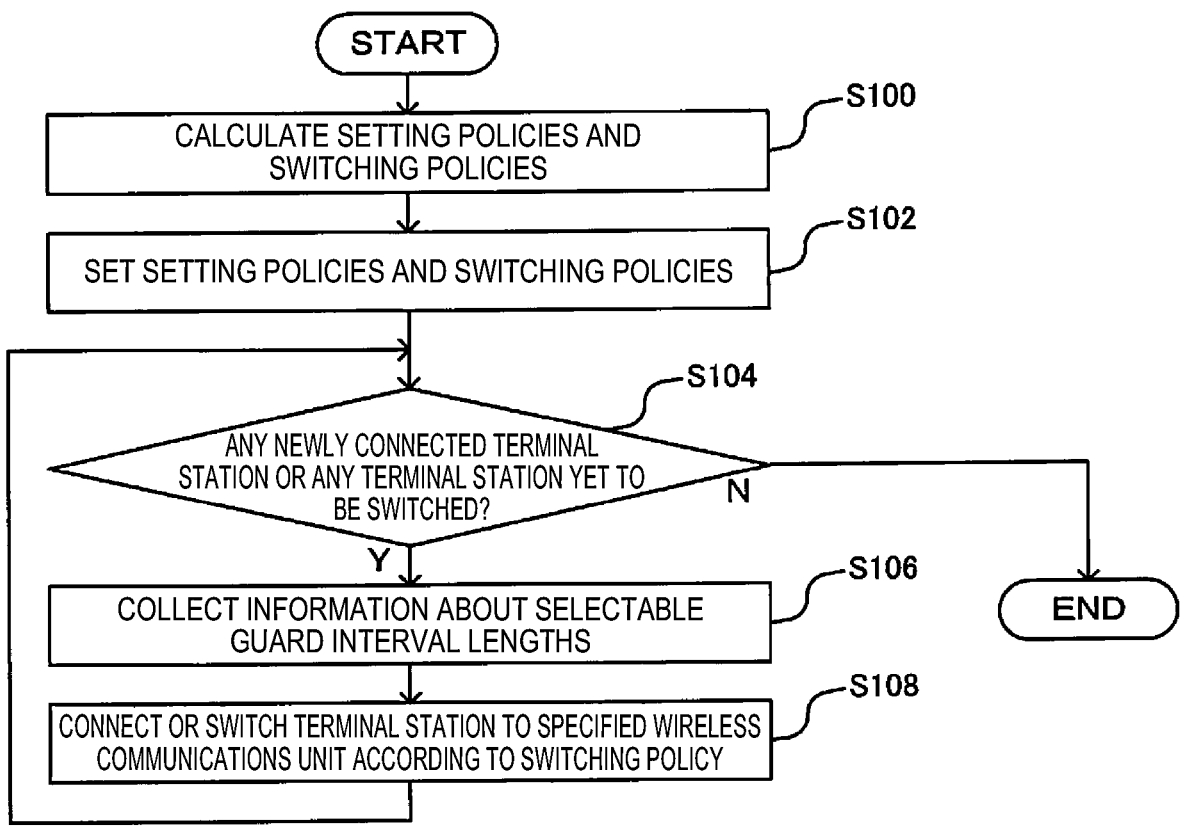
FIG. 7 is a flowchart showing a first operation example of a base station that uses a setting policy and switching policy.

FIG. 7 is a flowchart showing a first operation example of the base station 5 that uses the setting policy and switching policy. The policy calculation unit 53 of the base station 5 (FIG. 3) calculates the setting policies and switching policies for the classes of the terminal stations (S100).

Specifically, based on the information collected by the collection unit 52, or the preset number of connected terminal stations, class of each terminal station, and estimated traffic volume, the policy calculation unit 53 calculates predicted throughputs available when combinations of all or part of setting policies and switching policies are applied and selects the setting policy and switching policy that will maximize the predicted throughput, as calculation results.

Then, the setting unit 54 sets setting policies and switching policies for the wireless communications units 51-1 to 51-*n*, the setting policies and switching policies having been calculated by the policy calculation unit 53 for the respective classes of the terminal stations (S102). The processes of S100 and S102 are default processes of the base station 5.

Next, the collection unit 52 determines whether there is any newly connected terminal station or any terminal station yet to be switched (S104). If there is no newly connected terminal station or terminal station yet to be switched, the processing is finished. If there is any newly connected terminal station or any terminal station yet to be switched, the flow goes to the process of S106.

In the process of S106, the collection unit 52 collects information about the Guard interval lengths selectable by the terminal station.

Then, according to the switching policy calculated by the policy calculation unit 53, the setting unit 54 connects or switches the terminal station to a specified wireless communications unit 51 (S108). Then, the base station 5 returns to the process of S104 and repeats the process until there is no longer any newly connected terminal station or terminal station yet to be switched.

Note that the determination in the process of S104 as to whether there is any newly connected terminal station or any terminal station yet to be switched may be made by the control unit 56 based, for example, on a state, stored in the storage unit 55, as to how the processes of S106 and S108 are carried out on each of the terminal stations.

Also, concrete switching methods for switching the connection destination of the terminal station from the current wireless communications unit 51 to another wireless communications unit 51 include the following method. For example, there is a method whereby the base station 5 cuts wireless connection with the terminal station by transmitting a deauthentication frame or disassociation frame and ignores or rejects a reconnect request to any wireless communications unit 51 other than the wireless communications unit 51 that is to become the connection destination after the switching. Also, if a connect request from a terminal station is not directed at the wireless communications unit 51 specified (set) by the setting policy and switching policy, the base station 5 may instruct the terminal station to reconnect to the specified wireless communications unit 51.

In this way, since the wireless communications units 51 to be connected with terminal stations are determined based on the setting policy and switching policy, the wireless communications system 1 can improve transmission efficiency compared to a conventional wireless communications system in which terminal stations select and connect to wireless communications units at random.

Next, relationships between the setting policy/switching policy and operation of the base station 5 will be described with reference to FIGS. 8 and 9.

FIG. 8 shows a relationship between the class of terminal stations and setting policy. FIG. 9 shows a relationship between the class of terminal stations and switching policy. As shown in FIGS. 8 and 9, suppose, for example, settings corresponding to class A and class B of terminal stations are setting policy X1 and switching policy Y1, and settings corresponding to class C and class D of terminal stations are setting policy X2 and switching policy Y2. Although the combination of classes classified by the setting policy and the combination of classes classified by the switching policy are identical here, the combinations may differ from each other.

In the example shown in FIGS. 8 and 9, the base station 5 sets the setting policy X1 and switching policy Y1, for example, for the wireless communications unit 51-1 and performs control such that the first terminal station 10 of class A and second terminal station 20 of class B will be connected to the wireless communications unit 51-1.

In so doing, suppose the third terminal station 30 of class C is connected to the wireless communications unit 51-1, according to the switching policy Y2, the base station 5 switches the connection destination of the third terminal station 30, for example, to the wireless communications unit 51-2 in which the setting policy X2 for accommodating terminal stations of class C has been set up.

Also, the base station 5 sets the setting policy X2 and switching policy Y2, for example, for the wireless communications unit 51-2 and performs control such that the third terminal station 30 of class C and fourth terminal station 40 of class D will be connected to the wireless communications unit 51-2.

In so doing, suppose the wireless communications unit 51-2 is connected with the first terminal station 10 of class A, according to the switching policy Y1, the base station 5 switches the connection destination of the first terminal station 10, for example, to the wireless communications unit 51-1 in which the setting policy X1 for accommodating terminal stations of class A has been set up.

Figure 10:
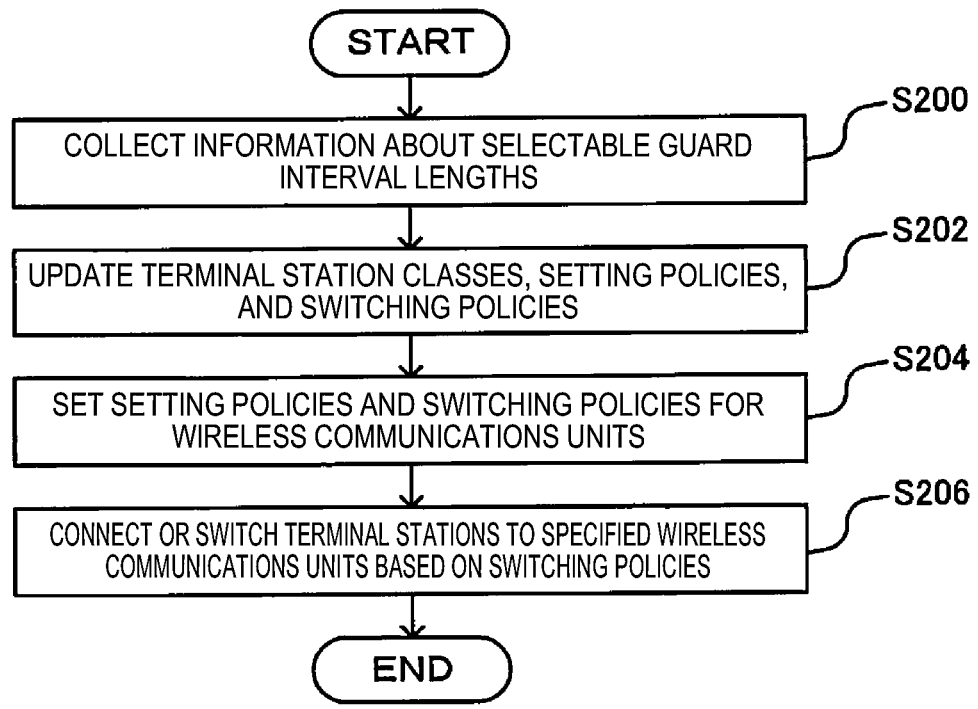
FIG. 10 is a flowchart showing a second operation example of the base station that uses the setting policy and switching policy.

FIG. 10 is a flowchart showing a second operation example of the base station 5 that uses the setting policy and switching policy.

First, the collection unit 52 of the base station 5 (FIG. 3) collects information about the Guard interval lengths selectable by the terminal station (S200).

Next, if it is found necessary to update the terminal station classes, setting policies, or switching policies based on the information collected by the collection unit 52, the policy calculation unit 53 of the base station 5 newly calculates the setting policies and switching policies for the terminal station classes and thereby updates the setting policies and switching policies (S202). For example, if the throughput falls below a threshold, the policy calculation unit 53 newly calculates the setting policies and switching policies.

The setting unit 54 sets the newly calculated setting policies and switching policies for the wireless communications units 51-1 to 51-*n*, the setting policies and switching policies having been newly calculated for the terminal station classes by the policy calculation unit 53 (S204). For example, if any of the terminal station classes, setting policies, and switching policies have been updated by the policy calculation unit 53, the setting unit 54 sets updated contents for the wireless communications units 51-1 to 51-*n*.

Then, based on the switching policies newly set by the setting unit 54, the base station 5 connects or switches the terminal stations to specified wireless communications units 51 (S206).

Next, a variation of the base station 5 will be described.

Figure 11:
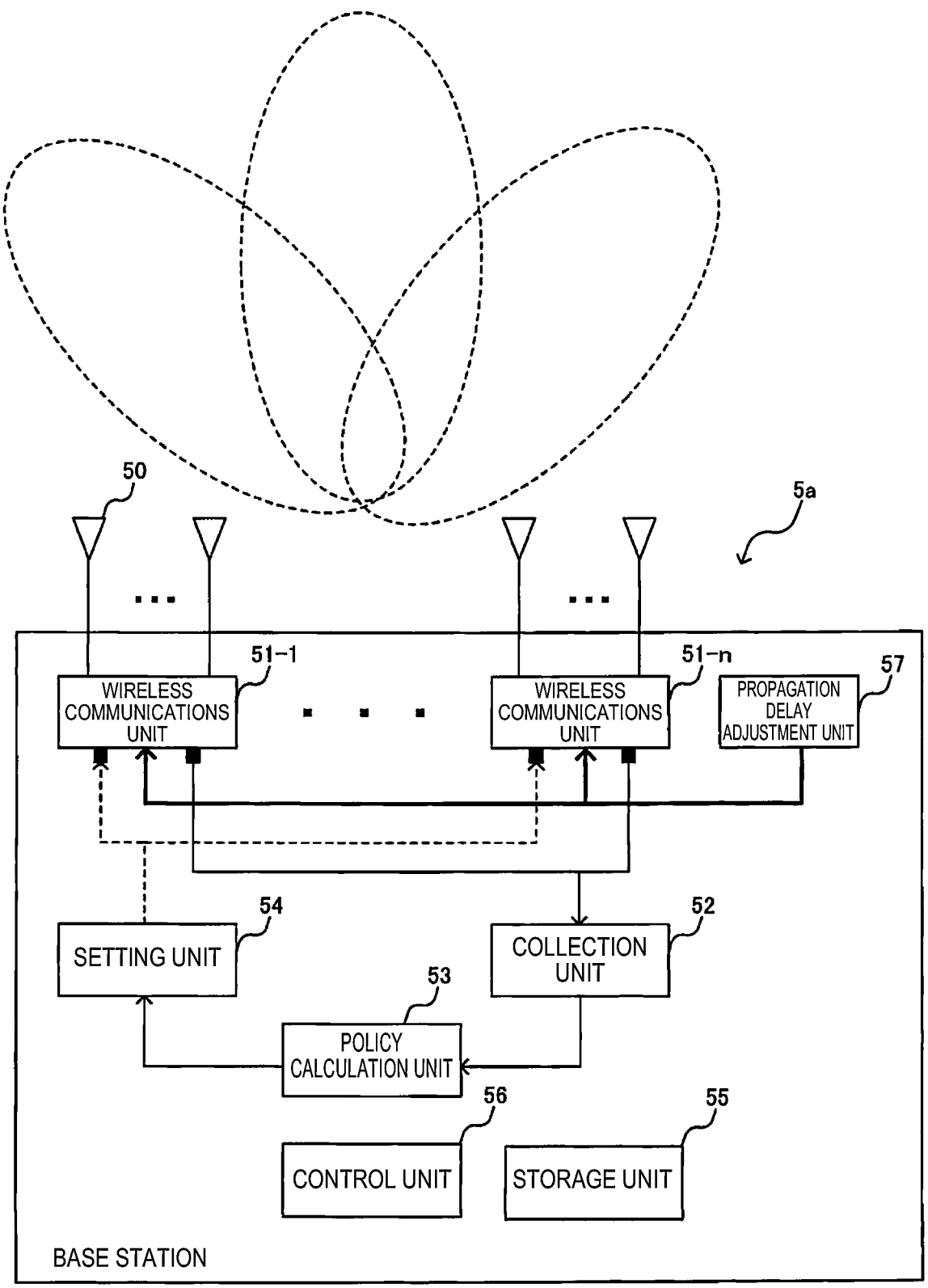
FIG. 11 is a diagram showing a configuration example of a variation of the base station according to the embodiment.

FIG. 11 shows a configuration example of a variation (base station 5*a*) of the base station 5 according to the embodiment. As shown in FIG. 11, the base station 5*a* includes, for example, plural antennas 50, n wireless communications units 51-1 to 51-*n*, a collection unit 52, a policy calculation unit 53, a setting unit 54, a storage unit 55, and a control unit 56, and a propagation delay adjustment unit 57. Note that other functional blocks which base stations are typically equipped with are not illustrated and that substantially the same components as those of the base station 5 shown in FIG. 3 are denoted by the same reference signs as the corresponding components in FIG. 3.

The propagation delay adjustment unit 57 assigns weights, for example, to no-illustrated analog elements of the wireless communications units 51-1 to 51-*n* or assigns weights to the antennas 50 through digital signal processing in the wireless communications units 51-1 to 51-*n*. Then, the propagation delay adjustment unit 57 combines transmit and receive signals of the plural antennas 50 and thereby changes directivity of the antennas. By changing the directivity of the antennas and thereby adjusting propagation delays along paths, it is possible to adjust classification of terminal station classes.

That is, by changing the directivity of the antennas and thereby adjusting amounts of propagation delays along the paths, the propagation delay adjustment unit 57 can increase efficient Guard interval lengths, switch to an optimum wireless communications unit 51, and improve the transmission rate of the base station 5*a*.

Also, in addition to combining the transmit and receive signals of antennas, the base station 5*a* may be configured to adjust the amounts of propagation delays along the paths by switching or selecting plural antennas including distributed antennas. That is, the propagation delay adjustment unit 57 may be configured to adjust propagation delay times permitted by the respective wireless communications units 51-1 to 51-*n* based on the directivity of antennas or selection or combination of plural antennas.

Note that the wireless communications system 1 may set the setting policies and switching policies in such a way as to maximize communications quality of a specific terminal station or uniformly improve the communications quality of terminal stations. Also, although description has been given by citing an example in which connections are switched within a single base station 5, the wireless communications system 1 may switch connections across plural base stations without being limited to the above example.

Also, the collection unit 52, policy calculation unit 53, setting unit 54, and the like provided on the base stations 5 and 5*a* of the present invention, can be implemented by a computer and programs, where the programs can be recorded on a recording medium or provided via a network.

REFERENCE SIGNS LIST

1 Wireless communications system
5, 5*a* Base station
10 First terminal station
20 Second terminal station
30 Third terminal station
40 Fourth terminal station
102 Wireless communications unit
104 Notification unit
50 Antenna
51-1 to 51-*n* Wireless communications unit
52 Collection unit
53 Policy calculation unit
54 Setting unit
55 Storage unit
56 Control unit
57 Propagation delay adjustment unit

The invention claimed is:

1. A wireless communication method for connecting a base station with each of a plurality of terminal stations set to differ in Guard interval length, the base station being equipped with a plurality of wireless communications units each configured to be connectable with one or more of the terminal stations, the method comprising:
   a collection step of collecting information about the Guard interval length set for each of the terminal stations and connection information about the terminal stations;
   a policy calculation step of calculating a setting policy for setting the Guard interval length permitted for each of the wireless communications units and a switching policy for setting a condition for switching that one of the wireless communications units which is to be connected, for each of the terminal stations, based on each of the collected information about the Guard interval length and connection information about the terminal stations; and
   a setting step of setting those of the terminal stations which are to be connected, for each of the wireless communications units based on the calculated setting policy and switching policy.

2. The wireless communication method according to claim 1, wherein the wireless communications units are allowed to set a plurality of permitted Guard interval lengths.

3. The wireless communication method according to claim 1, further comprising an adjustment step of adjusting propagation delay times permitted by respective ones of the plurality of wireless communications units based on directivity of an antenna or selection or combination of a plurality of antennas.

4. A base station connected with each of a plurality of terminal stations set to differ in Guard interval length, the base station comprising:
   a plurality of wireless communications units each configured to be connectable with one or more of the terminal stations;

a collection unit configured to collect information about the Guard interval length set from each of the terminal stations and connection information about the terminal stations;

a policy calculation unit configured to calculate a setting policy for setting the Guard interval length permitted for each of the wireless communications units and a switching policy for setting a condition for switching that one of the wireless communications units which is to be connected, for each of the terminal stations, based on each of the information about the Guard interval length and the connection information about the terminal stations, the information being collected by the collection unit; and a setting unit configured to set those of the terminal stations which are to be connected, for each of the wireless communications units based on the setting policy and switching policy calculated by the policy calculation unit.

5. The base station according to claim 4, wherein the wireless communications units are allowed to set a plurality of permitted Guard interval lengths.

6. The base station according to claim 4, further comprising a propagation delay adjustment unit configured to adjust propagation delay times permitted by respective ones of the plurality of wireless communications units based on directivity of an antenna or selection or combination of a plurality of antennas.

* * * * *